Sept. 16, 1924.

W. E. SIMPSON

WORK HOLDING CLAMP

Filed Dec. 5, 1919

Inventor
William E. Simpson

By Whittemore, Hulbert & Whittemore
Attorneys

Sept. 16, 1924.

W. E. SIMPSON
WORK HOLDING CLAMP
Filed Dec. 5, 1919

Inventor
William E. Simpson

By Whittemore, Hulbert & Whittemore
Attorneys

Patented Sept. 16, 1924.

1,508,729

UNITED STATES PATENT OFFICE.

WILLIAM E. SIMPSON, OF DETROIT, MICHIGAN, ASSIGNOR TO PALMER-BEE COMPANY, OF DETROIT, MICHIGAN, A CORPORATION OF MICHIGAN.

WORK-HOLDING CLAMP.

Application filed December 5, 1919. Serial No. 342,749.

*To all whom it may concern:*

Be it known that I, WILLIAM E. SIMPSON, a subject of the King of Great Britain and Ireland, residing at Detroit, in the county of Wayne and State of Michigan, have invented certain new and useful Improvements in Work-Holding Clamps, of which the following is a specification, reference being had therein to the accompanying drawings.

The invention relates to work-holding clamps, being more particularly designed for use on traveling conveyors of work assembling machines. It is the object of the invention to provide a rigid and powerful clamp or work holder which is adapted to receive and securely hold one element of the assembly during the operations of securing thereto the cooperating elements. It is a further object to obtain a construction in which the work may be clamped and released by a simple lever movement and one which permits of automatic release by a stop engaging the lever. The invention therefore consists in the novel construction as hereinafter set forth.

Figure 1:
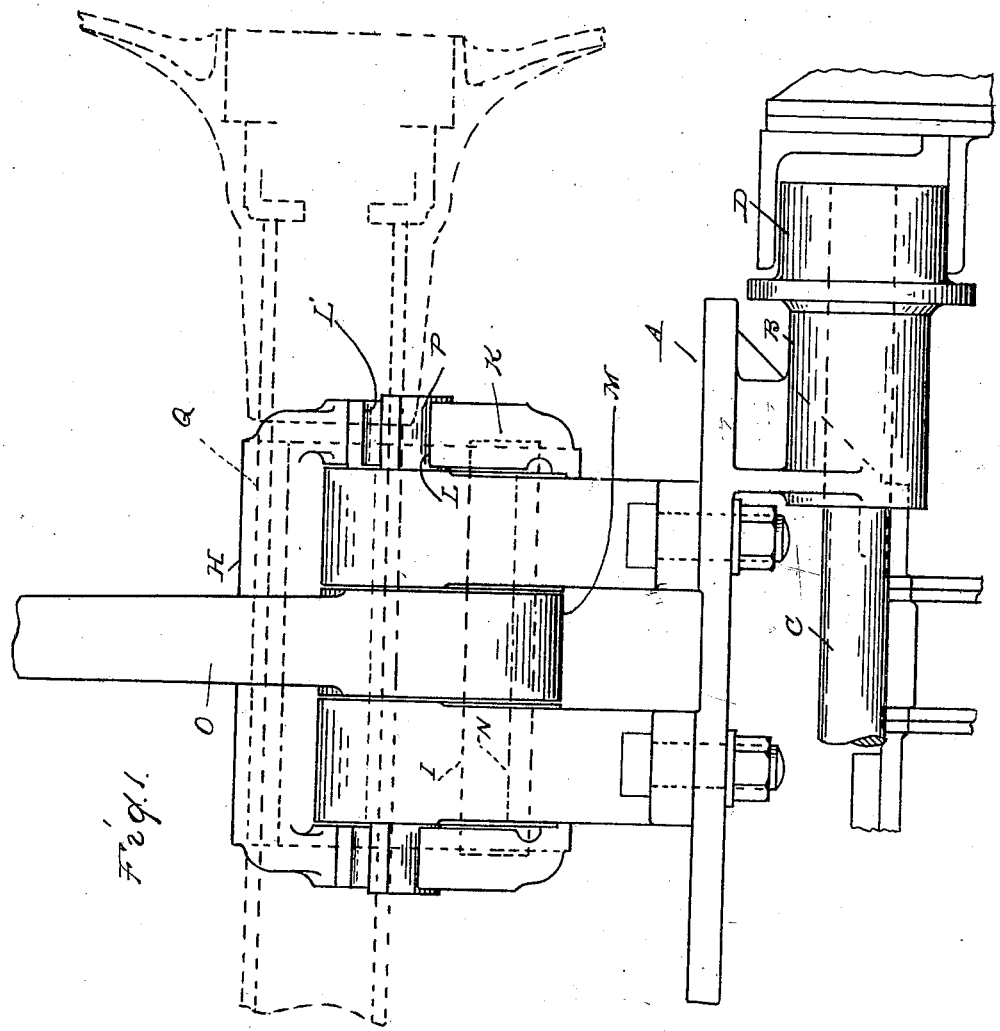
Figure 1 is an end elevation of the work clamp showing in dotted lines one element of an axle assembly in engagement therewith.

In the assembling of structures, such for instance as driving axles for motor vehicles, it is necessary to provide a rigid and powerful clamp for holding the element to which the other elements are secured. Furthermore, where the clamp or work-holder is mounted on a continuously moving conveyor, it is desirable that the actuating mechanism should be one easily manipulated and capable of automatic release. Thus a screw clamp is unsuited for this purpose and many other usual actuating devices are either too slow in manipulation or are lacking in power. It is also necessary for certain uses, such as the holding of drive axle assemblies, that the clamp should be capable of considerable movement to provide clearance for receiving the work and at the same time to exert a powerful clamping pressure thereon. I have overcome these difficulties by a novel construction in which the clamping movement is accomplished by a triangular eccentric in cooperation with a pivot clamping jaw. This mechanical movement provides; first, for a quick operation with sufficient amplitude of movement for free engagement of the work; second, a powerful clamping of the work; third, a frictional holding of the clamp which cannot be accidentally released; fourth, a lever actuating member which clamps when moved in the direction of travel and may be automatically released by contact with a stop.

In detail, A is a bed member having bearings B for axles C on which are mounted wheels D for engaging the track. E is a block mounted upon the bed and secured thereto by clamping bolts F or other suitable means. The upper portion of the block E is transversely recessed to receive a jaw member G which as shown has a concave segmental bearing face for engaging one side of an axle housing member. H is a movable jaw member which is pivotally connected to the block E by the pin I and above this pivot bearing said jaw member is transversely recessed to receive a clamping jaw J. K is a laterally-extending arm portion of the member H formed at its inner end with a longitudinally extending slot L and as specifically shown the member H is bifurcated to provide two of said arms K spaced from each other. M is a bearing block secured to the bed A and arranged between the arms K. N is a rock shaft journaled in the block M and centrally provided with a lever arm O, while at opposite ends said shaft is provided with triangular eccentrics P. These eccentrics are so formed as to engage the longitudinal slots L and in the rocking movement of the lever O to cause a swinging movement of the jaw member H. The eccentrics P are formed with arcuate surfaces concentric, respectively, with the several apexes of an equi-lateral triangle and the radius of each arc is equal to the width of the slot L. Therefore, during the rocking movement of the shaft N contact is maintained between the eccentric and the arm K in all positions of adjustment. Furthermore the eccentrics P are so formed that one of the arcuate surfaces P' is drawn from a center slightly eccentric to the axis of the shaft N, so that when this surface is in engagement with the side of the slot L, a very gradual and powerful movement will be imparted to the arm K.

Also the surface P' is within the angle of friction in its engagement with the side of the slot L and therefore will frictionally lock at each point of adjustment.

Figure 2:
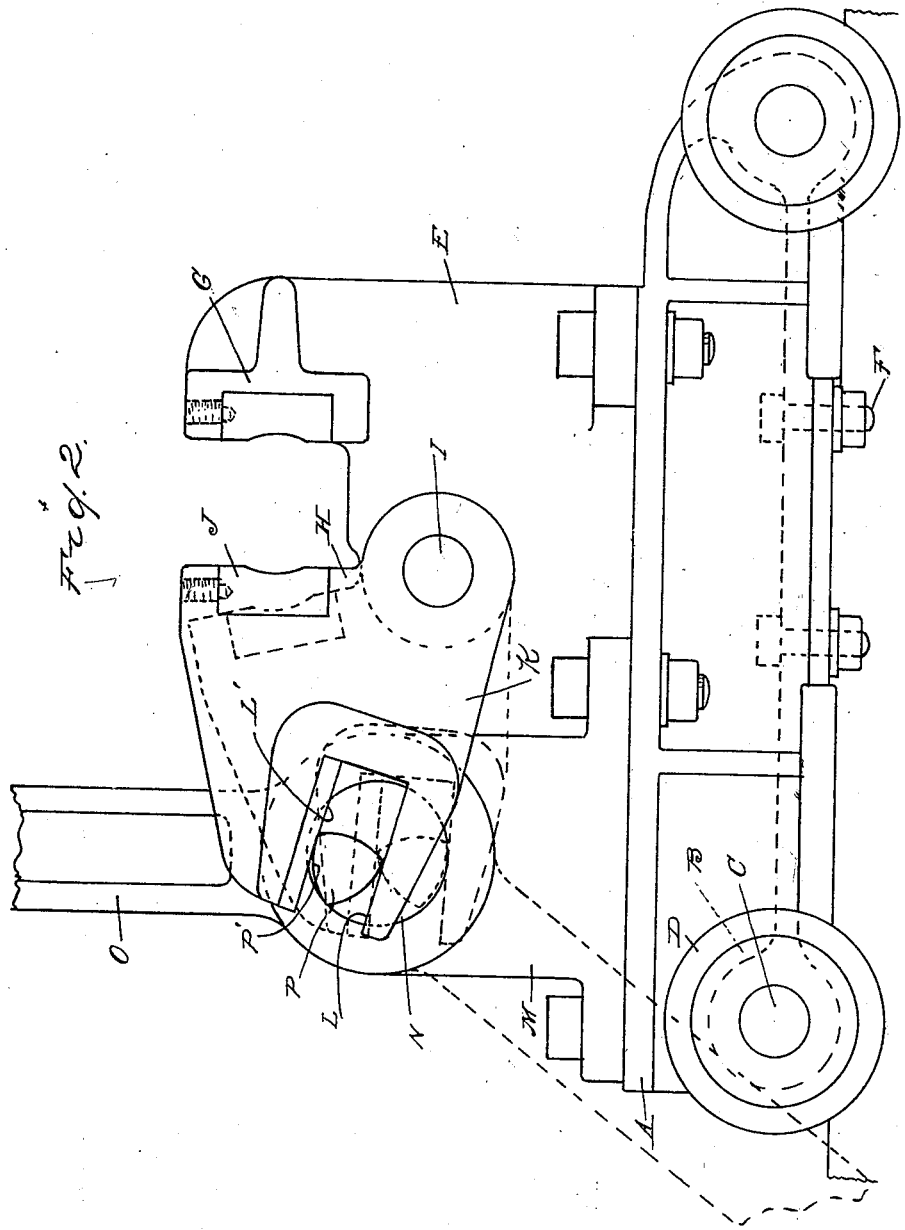
Figure 2 is a side elevation of the clamp.
Figure 3:
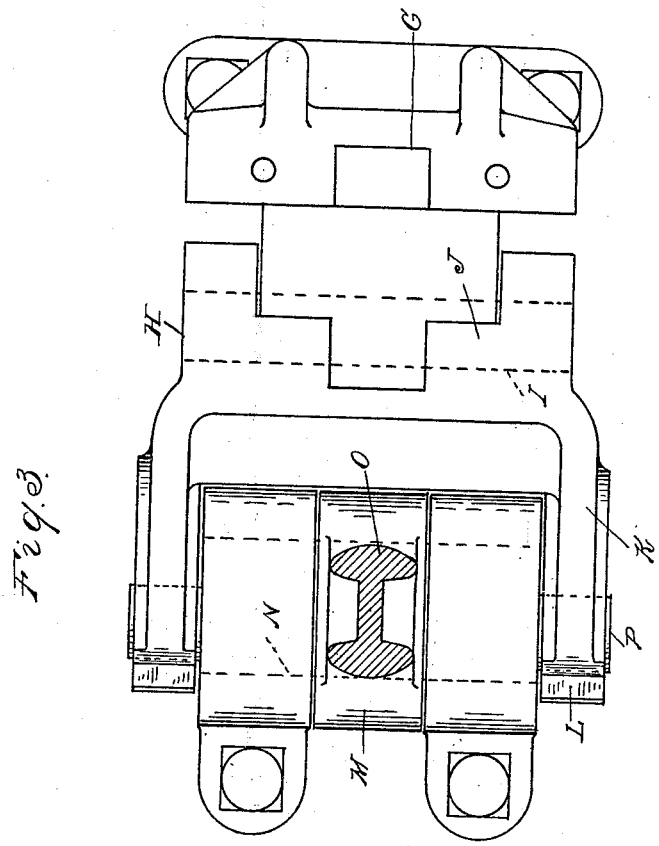
Figure 3 is a plan view.

In operation, the lever O initially stands in substantially horizontal position and in this position the triangular eccentric P is below the axis of the shaft N, as indicated in dotted lines in Figure 2. The movable jaw H is therefore held in the position shown in dotted lines, where it is retracted to receive the work such as the axle housing section Q. If the lever O is then thrown upward, the first portion of its movement will impart a quick rocking movement to the arm K carrying the jaw member J into close proximity to the work to be clamped. Before, however, pressure is applied to the work the eccentric P has a cylindrical portion where the face P' thereof is in contact with the upper edge L' of the slot L. The character of movement will then be altered to a slow, powerful operation furnishing the necessary pressure to securely clamp the work. When the jaws are in full clamping engagement, they will be automatically locked as the angle of the surface P' to the surface L' is within the angle of friction. To release the clamp the lever is thrown down from a vertical to a horizontal position and this can be automatically accomplished by engagement with a stop during the continued travel of the conveyer.

What I claim as my invention is:

1. A work clamp comprising a stationary jaw member, a movable jaw member pivotally connected thereto, a rock shaft, and a cam on said rock shaft eccentric to the axis thereof and engaging said movable jaw member, said cam having a portion for imparting a quick movement of relatively great amplitude to said jaw member, and a succeeding portion for imparting a slow powerful movement of slight amplitude in the same direction.

2. A work clamp comprising a stationary jaw member, a movable jaw member pivotally secured thereto, a rock shaft, a triangular eccentric on said rock shaft having arcuate faces, one of said faces being drawn from a center widely spaced from the axis of said rock shaft to impart a quick movement of large amplitude and another of said arcuate surfaces being drawn from a center but slightly eccentric to the axis of the shaft to impart a slow powerful movement in the same direction.

3. A work clamp comprising a stationary jaw member, a movable jaw member pivotally attached thereto and having a laterally-extending bifurcated portion provided with longitudinal slotted bearings, a rock shaft journaled in a bearing between the furcations of said movable jaw member, triangular eccentrics at opposite ends of said rock shaft for engaging the slotted bearings in said furcations, and a centrally arranged lever arm for rocking said shaft.

4. A work clamp comprising a stationary jaw member, a movable jaw member having a slot and a cam engaging in the slot of said movable jaw member, said cam having arcuate portions for imparting to said movable jaw member a quick movement of relatively great amplitude, and a succeeding portion for imparting thereto a slow powerful movement of slight amplitude in the same direction, the arcuate portions being concentric with the apices of an equi-lateral triangle and the radius of each arc being equal to the width of the slot.

5. A work clamp comprising a stationary jaw member, a movable jaw member pivotally secured thereto and a triangular eccentric engageable with said movable jaw member, said eccentric having a portion for imparting to said movable jaw member a quick movement of relatively great amplitude, and a succeeding portion for imparting to said movable jaw member a slow powerful movement of slight amplitude in the same direction, said portions having the same radius.

In testimony whereof I affix my signature.

WILLIAM E. SIMPSON.